US008299978B2

(12) United States Patent
Gates et al.

(10) Patent No.: US 8,299,978 B2
(45) Date of Patent: Oct. 30, 2012

(54) WIRELESS ACCESS POINT

(75) Inventors: Dirk Ion Gates, Westlake Village, CA (US); James Kirk Mathews, Hidden Hills, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 706 days.

(21) Appl. No.: 11/816,060

(22) PCT Filed: Mar. 9, 2006

(86) PCT No.: PCT/US2006/008696
§ 371 (c)(1),
(2), (4) Date: Apr. 20, 2009

(87) PCT Pub. No.: WO2006/096852
PCT Pub. Date: Sep. 14, 2006

(65) Prior Publication Data
US 2010/0061349 A1    Mar. 11, 2010

Related U.S. Application Data

(63) Continuation-in-part of application No. 29/217,531, filed on Nov. 17, 2004.

(60) Provisional application No. 60/660,171, filed on Mar. 9, 2005, provisional application No. 60/660,276, filed on Mar. 9, 2005, provisional application No. 60/660,375, filed on Mar. 9, 2005, provisional application No. 60/660,275, filed on Mar. 9, 2005, provisional application No. 60/660,210, filed on Mar. 9, 2005, provisional application No. 60/660,174, filed on Mar. 9, 2005, provisional application No. 60/660,394, filed on Mar. 9, 2005, provisional application No. 60/660,209, filed on Mar. 9, 2005, provisional application No. 60/660,393, filed on Mar. 9, 2005, provisional application No. 60/660,269, filed on Mar. 9, 2005, provisional application No. 60/660,392, filed on Mar. 9, 2005, provisional application No. 60/660,391, filed on Mar. 9, 2005, provisional application No. 60/660,277, filed on Mar. 9, 2005, provisional application No. 60/660,302, filed on Mar. 9, 2005, provisional application No. 60/660,376, filed on Mar. 9, 2005, provisional application No. 60/660,541, filed on Mar. 9, 2005.

(30) Foreign Application Priority Data

Mar. 9, 2006   (WO) ............... PCT/US2006/008743
Mar. 9, 2006   (WO) ............... PCT/US2006/008744
Mar. 9, 2006   (WO) ............... PCT/US2006/008747

(51) Int. Cl.
*H01Q 15/24*   (2006.01)
*H01Q 21/00*   (2006.01)
*H01Q 21/20*   (2006.01)

(52) U.S. Cl. ........ 343/910; 343/908; 343/725; 343/799; 343/844

(58) Field of Classification Search .................. 343/910, 343/908, 725, 844, 799; 370/338
See application file for complete search history.

(56) References Cited

U.S. PATENT DOCUMENTS
4,042,935 A   8/1977   Ajioka et al.
(Continued)

*Primary Examiner* — Douglas W Owens
*Assistant Examiner* — Jennifer F Hu
(74) *Attorney, Agent, or Firm* — The Eclipse Group LLP

(57) ABSTRACT

A wireless access point is provided for transmitting radio signals that has isolators positioned about the perimeter of the wireless access point dividing the perimeter of the wireless access point into segments and reflector plates positioned within each segment for directing the transmission of the radio signals within each segment.

12 Claims, 14 Drawing Sheets

U.S. PATENT DOCUMENTS

| | | | |
|---|---|---|---|
| 4,649,391 A | 3/1987 | Tsuda et al. | |
| 4,726,050 A | 2/1988 | Menich et al. | |
| 5,389,941 A | 2/1995 | Yu | |
| 5,952,983 A | 9/1999 | Dearnley et al. | |
| 6,140,972 A | 10/2000 | Johnston et al. | |
| 6,157,811 A | 12/2000 | Dent | |
| 6,326,926 B1 | 12/2001 | Shoobridge et al. | |
| 6,329,954 B1 | 12/2001 | Fuchs et al. | |
| 6,374,078 B1 | 4/2002 | Williams et al. | |
| 6,452,565 B1 | 9/2002 | Kingsley et al. | |
| 6,539,204 B1 | 3/2003 | Marsh et al. | |
| 6,544,173 B2 | 4/2003 | West et al. | |
| 6,606,059 B1 | 8/2003 | Barabash | |
| 6,646,611 B2 | 11/2003 | Plet et al. | |
| 6,888,504 B2 | 5/2005 | Chiang et al. | |
| 6,903,703 B2 | 6/2005 | Durham et al. | |
| 6,933,909 B2 | 8/2005 | Theobold | |
| 6,963,305 B2 | 11/2005 | Knapp | |
| 7,057,566 B2 | 6/2006 | Theobold | |
| 7,103,386 B2 | 9/2006 | Hoffmann et al. | |
| 7,119,744 B2 * | 10/2006 | Theobold et al. | 343/700 MS |
| 7,136,655 B2 | 11/2006 | Shafidas et al. | |
| 7,193,562 B2 | 3/2007 | Shtrom et al. | |
| 7,202,824 B1 | 4/2007 | Sanelli et al. | |
| 7,253,783 B2 * | 8/2007 | Chiang et al. | 343/757 |
| 7,274,944 B2 | 9/2007 | Lastinger et al. | |
| 7,292,198 B2 | 11/2007 | Shtrom et al. | |
| 7,358,912 B1 | 4/2008 | Kish et al. | |
| 7,362,280 B2 | 4/2008 | Shtrom et al. | |
| 7,496,070 B2 | 2/2009 | Vesuna | |
| 7,498,996 B2 | 3/2009 | Shtrom et al. | |
| 7,498,999 B2 | 3/2009 | Shtrom | |
| 7,505,447 B2 | 3/2009 | Kish et al. | |
| 7,511,680 B2 | 3/2009 | Shtrom et al. | |
| 7,525,486 B2 | 4/2009 | Shtrom et al. | |
| 7,567,213 B2 | 7/2009 | Liu | |
| 7,646,343 B2 | 1/2010 | Shtrom et al. | |
| 7,652,632 B2 | 1/2010 | Shtrom | |
| 7,675,474 B2 | 3/2010 | Shtrom et al. | |
| 7,696,946 B2 | 4/2010 | Shtrom | |
| 7,787,436 B2 | 8/2010 | Kish et al. | |
| 7,864,119 B2 | 1/2011 | Shtrom et al. | |
| 8,078,194 B2 | 12/2011 | Walley et al. | |
| 8,184,062 B2 * | 5/2012 | Hartenstein | 343/799 |
| 2001/0033600 A1 | 10/2001 | Yang et al. | |
| 2002/0039082 A1 * | 4/2002 | Fox et al. | 343/909 |
| 2002/0163933 A1 | 11/2002 | Benveniste | |
| 2002/0186678 A1 | 12/2002 | Averbuch et al. | |
| 2003/0040319 A1 | 2/2003 | Hansen et al. | |
| 2003/0210193 A1 * | 11/2003 | Rossman et al. | 343/725 |
| 2004/0001429 A1 | 1/2004 | Ma et al. | |
| 2004/0005227 A1 | 1/2004 | Cremer et al. | |
| 2004/0052227 A1 | 3/2004 | Judd et al. | |
| 2004/0066326 A1 | 4/2004 | Knapp | |
| 2004/0102222 A1 | 5/2004 | Skafidas et al. | |
| 2004/0105412 A1 | 6/2004 | He et al. | |
| 2004/0143681 A1 | 7/2004 | Benveniste | |
| 2004/0157551 A1 | 8/2004 | Gainey et al. | |
| 2004/0196813 A1 | 10/2004 | Ofek et al. | |
| 2004/0203347 A1 | 10/2004 | Nguyen | |
| 2004/0224637 A1 | 11/2004 | Silva et al. | |
| 2004/0240424 A1 | 12/2004 | Fong et al. | |
| 2004/0242274 A1 | 12/2004 | Corbett et al. | |
| 2004/0259558 A1 | 12/2004 | Shafidas et al. | |
| 2004/0259563 A1 | 12/2004 | Morton et al. | |
| 2005/0020299 A1 | 1/2005 | Malone et al. | |
| 2005/0025254 A1 | 2/2005 | Awad et al. | |
| 2005/0035919 A1 | 2/2005 | Yang et al. | |
| 2005/0058097 A1 | 3/2005 | Kang et al. | |
| 2005/0058111 A1 | 3/2005 | Hung et al. | |
| 2005/0237258 A1 * | 10/2005 | Abramov et al. | 343/834 |
| 2005/0254470 A1 | 11/2005 | Yashar | |
| 2005/0255892 A1 | 11/2005 | Wong et al. | |
| 2006/0038738 A1 | 2/2006 | Shtrom | |
| 2006/0098616 A1 | 5/2006 | Kish et al. | |
| 2006/0109799 A1 | 5/2006 | Tseng et al. | |
| 2006/0233280 A1 | 10/2006 | Tynderfeldt et al. | |
| 2007/0066234 A1 | 3/2007 | Lastinger et al. | |
| 2007/0178927 A1 | 8/2007 | Fernandez-Corbaton et al. | |
| 2007/0210974 A1 | 9/2007 | Chiang | |
| 2007/0293178 A1 | 12/2007 | Milton et al. | |
| 2008/0136715 A1 | 6/2008 | Shtrom et al. | |
| 2008/0137681 A1 | 6/2008 | Kish et al. | |
| 2008/0221918 A1 | 9/2008 | Petersen et al. | |
| 2008/0225814 A1 | 9/2008 | Thermond et al. | |
| 2008/0267151 A1 * | 10/2008 | Hartenstein | 370/338 |
| 2008/0268778 A1 | 10/2008 | De La Garrigue et al. | |
| 2008/0274748 A1 | 11/2008 | Lastinger et al. | |
| 2008/0291098 A1 | 11/2008 | Kish et al. | |
| 2009/0028095 A1 | 1/2009 | Kish et al. | |
| 2009/0075606 A1 | 3/2009 | Shtrom et al. | |
| 2010/0053010 A1 | 3/2010 | Shtrom et al. | |
| 2010/0053023 A1 | 3/2010 | Shtrom et al. | |
| 2010/0103065 A1 | 4/2010 | Shtrom et al. | |
| 2010/0103066 A1 | 4/2010 | Shtrom et al. | |
| 2010/0119002 A1 * | 5/2010 | Hartenstein | 375/267 |

* cited by examiner

WIRELESS ACCESS POINT

CROSS REFERENCE TO RELATED APPLICATIONS

This application is a continuation-in-part of U.S. Design patent application Ser. No. 29/217,531, titled "ELECTRONIC DEVICE HOUSING" filed Nov. 17, 2004, which is incorporated herein by reference. This application claims priority to the provisional patent applications, Ser. No. 60/660,171, titled "WIRELESS LAN ARRAY," by Dirk I. Gates, Ian Laity, Mick Conley, Mike de la Garrigue, and Steve Smith, filed on Mar. 9, 2005, and incorporated herein by reference; Ser. No. 60/660,276, titled "WIRELESS LAN ARRAY," by Dirk I. Gates, Ian Laity, Mick Conley, Mike de; la Garrigue, and Steve Smith, filed on Mar. 9, 2005, and incorporated herein by reference; Ser. No. 60/660,375, titled "WIRELESS ACCESS POINT," by Dirk I. Gates and Ian Laity, filed on Mar. 9, 2005, and incorporated herein by reference; Ser. No. 60/660,275, titled "MULTI-SECTOR WIRELESS ACCESS POINT ARRAY," by Dirk I. Gates Ian Laity, Mick Conley, Mike de la Garrigue, and Steve Smith, filed on Mar. 9, 2005, and incorporated herein by reference; Ser. No. 60/660,210, titled "MEDIA ACCESS CONTROLLER FOR USE IN A MULTI-SECTOR WIRELESS ACCESS POINT ARRAY," by Mike de la Garrigue and Drew Bertagna filed on Mar. 9, 2005, and incorporated herein by reference; Ser. No. 60/660,174, titled "QUEUE MANAGEMENT CONTROLLER FOR USE IN A MULTI-SECTOR WIRELESS ACCESS POINT ARRAY," by Mike de la Garrigue and Drew Bertagna filed on Mar. 9, 2005, and incorporated herein by reference; Ser. No. 60/660,394, titled "WIRELESS LAN ARRAY," by Dirk I. Gates, Ian. Laity, Mick Conley, Mike de la Garrigue, and Steve Smith, filed on Mar. 9, 2005, and incorporated herein by reference; Ser. No. 60/660,209, titled "WIRELESS LAN ARRAY ARCHITECTURE," by Dirk I. Gates, Ian Laity, Mick Conley, Mike de la Garrigue, and Steve Smith, filed on Mar. 9, 2005, and incorporated herein by reference; Ser. No. 60/660,393, titled "ANTENNA ARCHITECTURE OF A WIRELESS LAN ARRAY," by Abraham Hartenstein, filed on Mar. 9, 2005, and incorporated herein by reference; Ser. No. 60/660,269, titled "LOAD BALANCING IN A MULTI-RADIO WIRELESS LAN ARRAY BASED ON AGGREGATE MEAN LEVELS," by Mick Conley filed on Mar. 9, 2005, and incorporated herein by reference; Ser. No. 60/660,392, titled "ADVANCED ADJACENT CHANNEL SECTOR MANAGEMENT FOR 802.11 TRAFFIC," by Mick Conley filed on Mar. 9, 2005, and incorporated herein by reference; Ser. No. 60/660,391, titled "LOAD BALANCING IN A MULTI-RADIO WIRELESS LAN ARRAY BASED ON AGGREGATE MEAN LEVELS," by Shaun Clem filed on Mar. 9, 2005, and incorporated herein by reference; Ser. No. 60/660,277, titled "SYSTEM FOR TRANSMITTING AND RECEIVING FRAMES IN A MULTI-RADIO WIRELESS LAN ARRAY," by Dirk I. Gates and Mike de la Garrigue, filed on Mar. 9, 2005, and incorporated herein by reference; Ser. No. 60/660,302, titled "SYSTEM FOR ALLOCATING CHANNELS IN A MULTI-RADIO WIRELESS LAN ARRAY," by Dirk I. Gates and Kirk Mathews, filed on Mar. 9, 2005, and incorporated herein by reference; Ser. No. 60/660,376, titled "SYSTEM FOR ALLOCATING CHANNELS IN A MULTI-RADIO WIRELESS LAN ARRAY," by Dirk I. Gates and Kirk Mathews, filed on Mar. 9, 2005, and incorporated herein by reference; Ser. No. 60/660,541, titled "MEDIA ACCESS CONTROLLER FOR USE IN A MULTI-SECTOR WIRELESS ACCESS POINT ARRAY," by Dirk I. Gates and Mike de la Garrigue, filed on Mar. 9, 2005, and incorporated herein by reference; and PCT patent application, serial number PCT/US2006/008747, titled "WIRELESS LOCAL AREA NETWORK ANTENNA ARRAY," filed on Mar. 9, 2006, which claims priority to the above provisional patent applications, and incorporated by reference herein; PCT patent application serial number PCT/US2006/008744, titled "MEDIA ACCESS CONTROLLER FOR USE IN A MULTI-SECTOR WIRELESS ACCESS POINT ARRAY," filed on Mar. 9, 2006, and incorporated by reference herein; PCT patent application serial number PCT/US2006/008743, titled "ACCESS POINT IN A WIRELESS LAN," filed on Mar. 9, 2006, and incorporated by reference herein; PCT patent application serial number PCT/US2006/008698, titled "SYSTEM FOR ALLOCATING CHANNELS IN A MULTI-RADIO WIRELESS LAN ARRAY," filed on Mar. 9, 2006, and incorporated by reference herein.

BACKGROUND OF THE INVENTION

1. Field of the Invention

This invention relates generally to wireless access points. In particular, this invention relates to a wireless access for increasing the coverage area of a single wireless access point using a multi-sector antenna system.

2. Related Art

Currently available wireless access points are often time deficient in coverage area, range and capacity. To provide access for large or obstructed areas, and to provide additional capacity for data intensive networks, multiple wireless access point devices and switches need to be deployed and used simultaneously. Deploying multiple wireless access points in a given area only provides incremental improvements in capacity due to the channel reuse and co-channel interference problems that arise from placing multiple wireless access points in close proximity to each other. Current architectures are not capable of maximizing capacity because they lack the ability to allow densely deployed wireless access points to operate together and isolate RF bleed-over of transmissions between cells on the same channel, which is a fundamental problem with allowing multiple wireless access points to function at very close proximity to each other.

A need therefore exists for a wireless access point, such as wireless access point for use in a local area network, i.e., a wireless LAN array, that overcomes some of the shortcomings of currently available wireless access points by providing an wireless access point with increased network capacity and increased coverage in all directions.

In particular, a need exists for a wireless access point that allows for the co-location of antennas, radios and switches and that minimizes electromagnetic crosstalk and interference issues resulting from the co-location of multiple antennas, radios and switches.

SUMMARY

A wireless access point is provided that minimizes electromagnetic crosstalk, interference and co-location issues between neighboring radios and antennas, which by their implementation, enable a multitude of radios and antennas to be deployed within a single device. In particular, a wireless access point with a multitude of radios is provided for transmitting radio signals having a digitally isolated, high-gain, multi-sector antenna system positioned about the perimeter of the wireless access point. The wireless access point further includes both reflective surfaces and absorptive isolators positioned within each antenna sector for the purpose of directing the transmission of the radio signals within each segment and enabling radio co-existence.

In one example of one implementation of the wireless access point, the wireless access point integrates a WLAN switch and up to sixteen 802.11 Wi-Fi wireless access points and associated antennas into a single device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
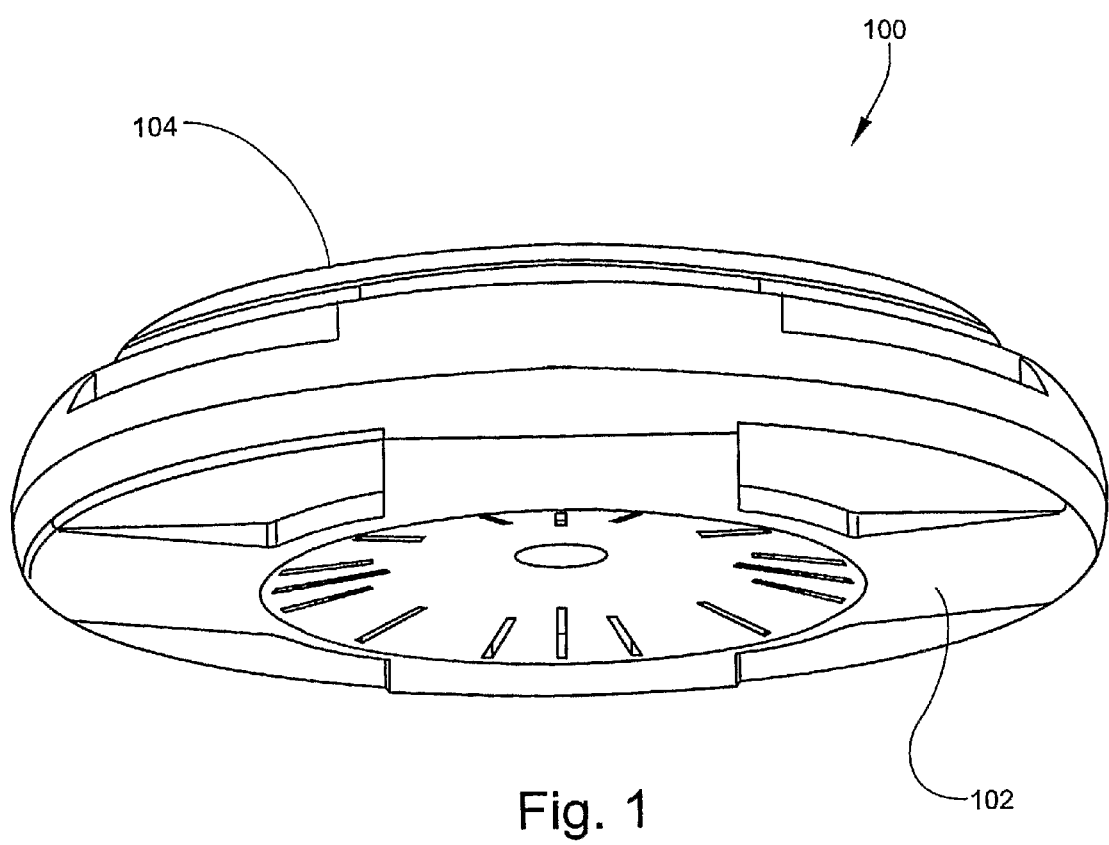
FIG. 1 is a top perspective view of one example of an implementation of the wireless access point.
Figure 3:
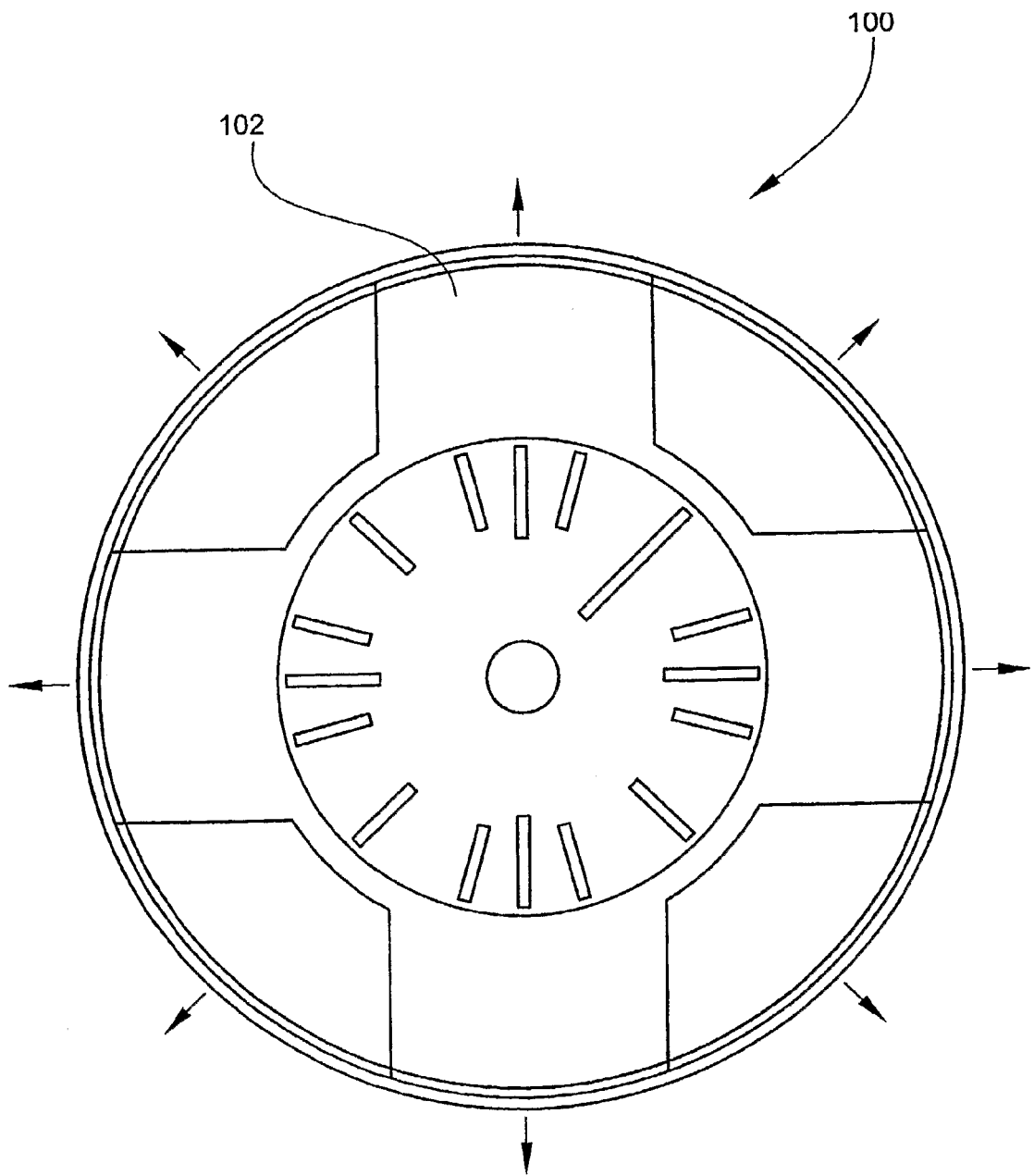
FIG. 3 is a top view of the wireless access point of FIG. 1.
Figure 4:
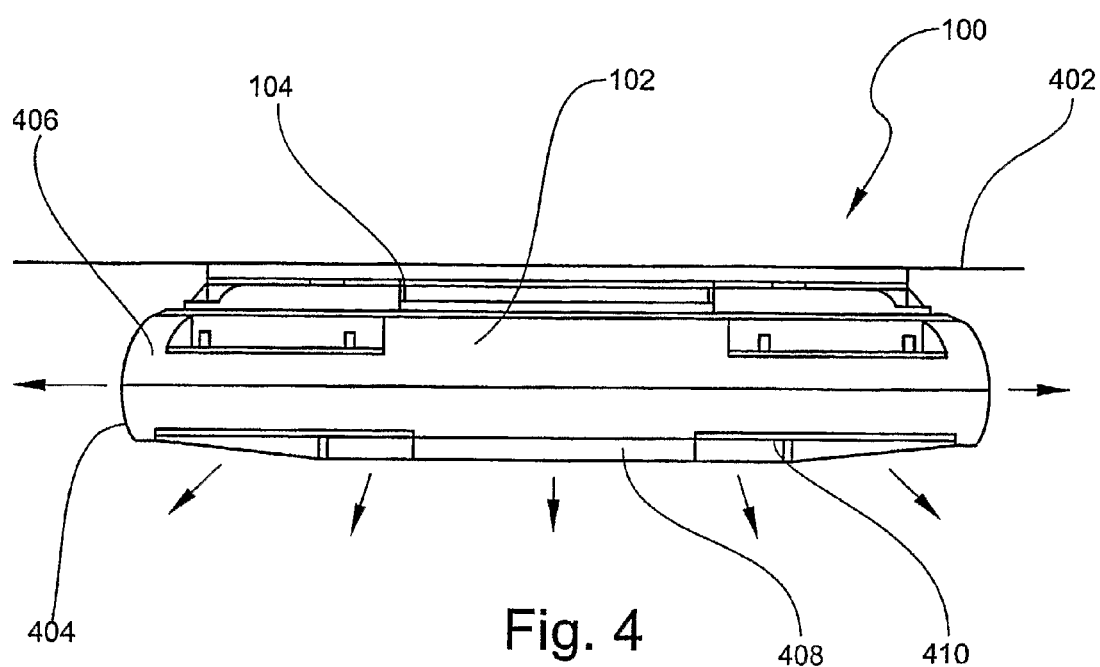
FIG. 4 is a side view of the wireless access point of FIG. 1.

FIG. 1 is a top perspective view of one example of an implementation of a wireless access point 100. The wireless access point 100 consists generally of an array portion 102 and a securing portion 104. As illustrated, the wireless access point 100 may be generally circular in shape or other shape, such as an ellipsis or a polygon, e.g., a pentagon, octagon, hexagon, etc., capable of transmitting signals in all directions. In particular, the wireless access point 100 may be designed to transmit signals 360 degrees outwardly from the center of the wireless access point 100, as illustrated in FIG. 3 (see below), and 180 degrees outward from the array portion 102 relative to the securing portion 104, as illustrated in FIG. 4 (see below).

The wireless access point 100 may be positioned at a point elevated above the desired coverage area, such as the ceiling or mounted on a pole. In this case, transmissions would be directed downward and outward from the wireless access point 100, as illustrated in FIG. 4 (see below). Alternatively, the wireless access point 100 could be inverted and placed at a position either below or within the coverage area, such as on the floor or on a table. In this manner, the coverage would be directed upward and outward, rather than downward and outward, as illustrated in FIG. 4. For purposes of this application, the top of the wireless access point 100 shall be the side of the wireless access point 100 that is positioned toward the coverage zone, regardless of whether the wireless access point 100 is facing upward or downward. The bottom of the wireless access point 100 shall be the side of the wireless access point 100 that is positioned away from the coverage zone, or the side of the wireless access point 100 having the securing portion 104.

Accordingly, the securing portion 104 of the wireless access point 100 may positioned either upward or downward depending upon whether the wireless access point 100 is positioned above, below or within the desired coverage area. Similarly, despite the terminology used in this application, the array portion 102 of the wireless access point 100 may represent the bottom portion of the wireless access point 100 when positioned at a point elevated above the coverage area or the top portion of the wireless access point 100 when positioned within or below the desired coverage area. The wireless access point 100 may be powered by batteries, through an A/C power outlet or remotely through a D/C power supply.

Figure 2:
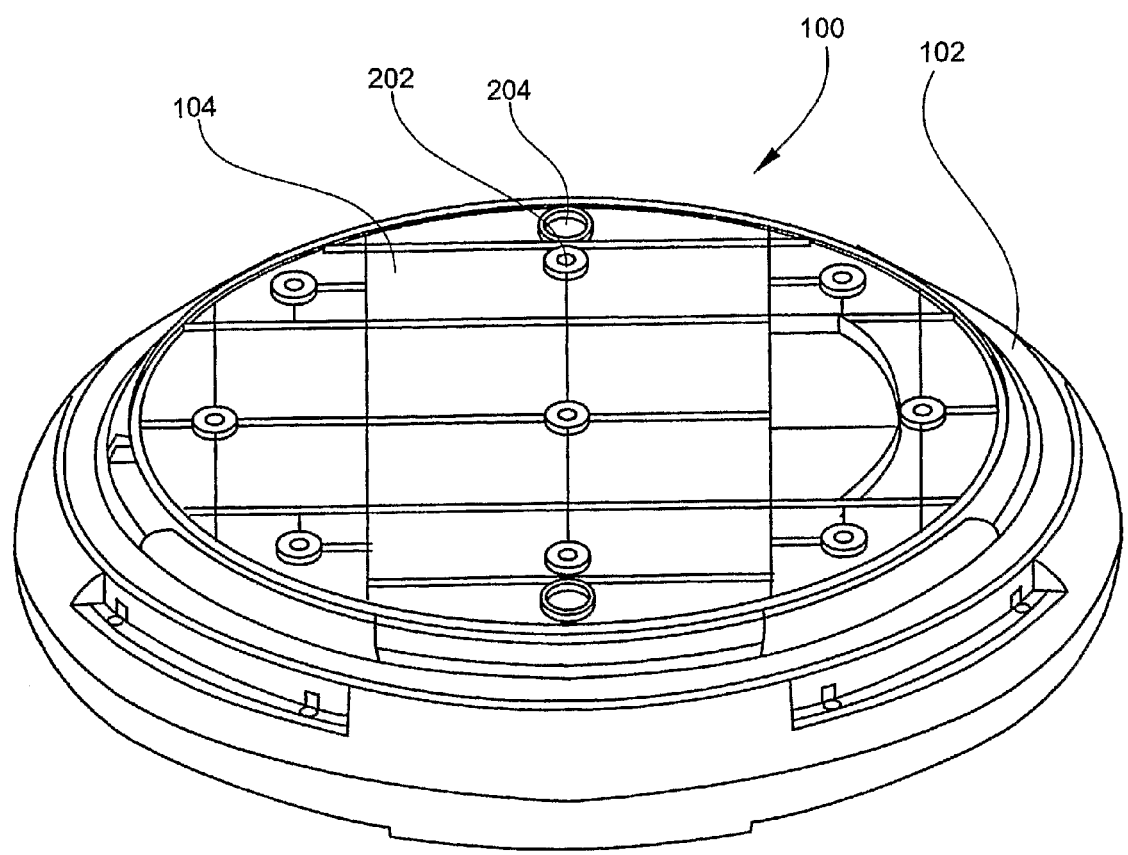
FIG. 2 is a bottom perspective view of the wireless access point of FIG. 1.

FIG. 2 is a bottom perspective view of the wireless access point 100 of FIG. 1. As illustrated in FIG. 2, the securing portion 104 if the wireless access point 100 may include holes 202 positioned at predetermined locations for securing the wireless access point 100 to different types of surfaces, such as drop ceiling brackets, in which case holes 202 may align with the positioning of the ceiling brackets. The securing portion 104 of the wireless access point may be secured first and then the array portion 102 is to be fastened to the securing portion 104 to assemble the wireless access point 100.

FIG. 3 is a top view of the wireless access point 100 of FIG. 1. As illustrated, the top view of the wireless access point 100 includes the array portion 102. As explained further below, it through the array portion 102 of the wireless access point 100 that the signal is transmitted 360 degrees from the circumference of the array portion 102 and 180 degrees outward from the array portion 102 relative to the securing portion 104, as illustrated in FIG. 4.

FIG. 4 is a side view of the wireless access point of FIG. 1. As illustrated in FIG. 4, the securing portion 104 of the wireless access point 100 is secured to a mounting element 402, such as a drop ceiling bracket. As further illustrated, the wireless access point 100 transmits signals 180 degrees outward from the array portion 102 relative to the securing portion 104 and/or mounting element 402. As further seen in FIG. 4, the array portion 102 includes a top cover 404 and a bottom cover 406. The top cover 404 of the array portion 102 includes an interior portion 408 and an exterior portion 410.

Figure 5:
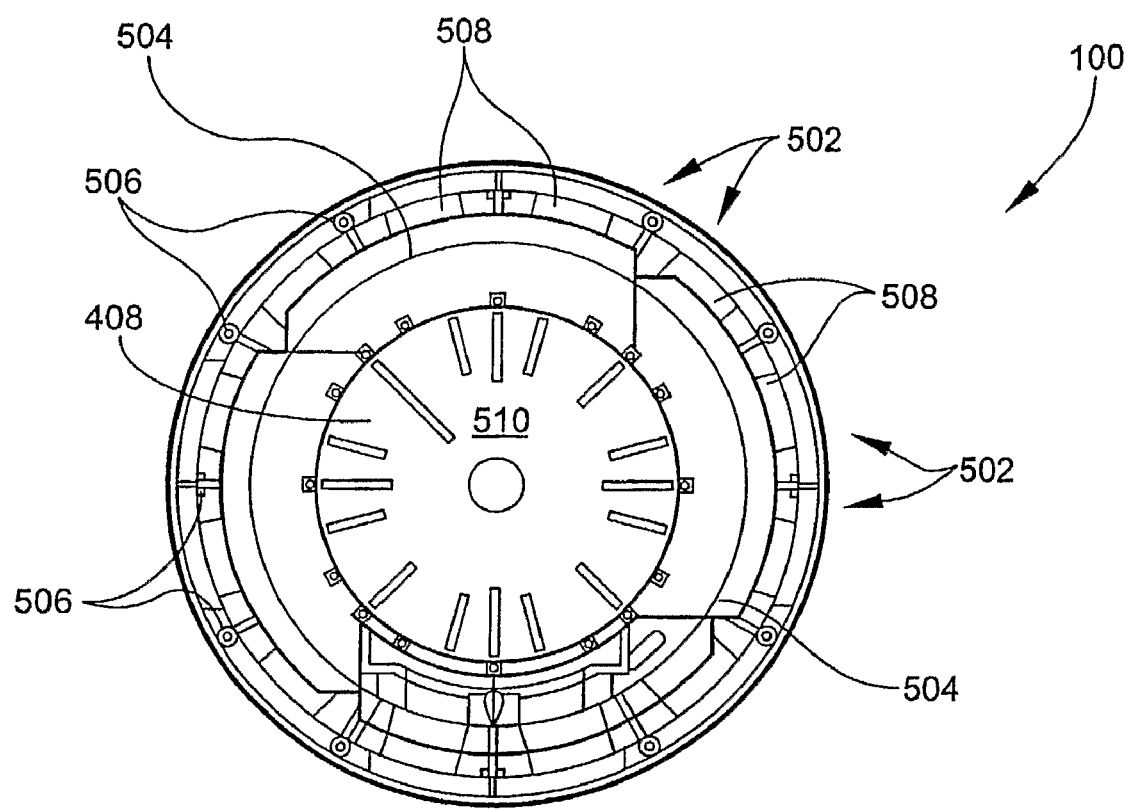
FIG. 5 is a top plan view of the wireless access point of FIG. 1 with the exterior portion of the top cover removed.

FIG. 5 is a top plan view of the wireless access point 100 of FIG. 1 with the exterior portion 410 of the top cover 404 removed, showing only the remaining interior portion 408 of the top cover 404. As illustrated, the perimeter of the wireless access point 100 is divided into antenna sectors 502. FIG. 5 illustrates the primary components of each antenna sector 520 and the implementation of a 16 integrated wireless access points, which in this example is twelve (12) 802.11a and four (4) 802.11a/b/g and the supportive 12 antenna sector 502 array. While in this example, the wireless access point 100 includes twelve antenna sectors 502 defined around the perimeter of the wireless access point 100, to twelve, may be defined in the wireless access point 100. The wireless access point 100 may be divided into multiple sectors 502 as necessary to achieve the desired coverage and network capacity. Further, while the example utilizes 802.11a and 802.11a/b/g channels, all approved 802.11 channels may utilized in connection with the wireless access point, including both currently approval and future approved frequencies and channels.

As illustrated in FIG. 5, the antenna sectors 502 are positioned in and around the circumference of the wireless access point 100 and are separated from the interior of the wireless access point 100, i.e., the central digital section 510, by a circular antenna reflector 504. In this example, the antenna sectors 502 are positioned in a circular pattern around the perimeter of the array section 102 of the wireless access point 100. Absorptive isolators 506 separate each antenna sector 502 at its sides, such that each antenna sector 502 includes two (2) absorptive isolators 506. The absorptive isolators 506 enhance the isolation from antenna sector 502 to antenna sector 502. These isolators 506 may be foam isolators of the type generally known in the industry and commercially available for the purpose of isolating radio transmission or may be any other isolator capable of absorbing electromagnetic energy. For example, the isolators 506 may be foam-filled graphite-isolated insulators to prevent interference between antenna sectors 502.

As illustrated, the isolators 506 form antenna sectors 502 about the perimeter of the wireless access point. The purpose of the isolators 506 is to isolate the antenna or antennas positioned within each antenna sector 502.

FIG. 5 also illustrates the inclusion of antenna sector deflectors 508 at the base of each antenna sector 502. The antenna deflectors 508 deflect the radio signals downward or away from the wireless access point in a 180 degree pattern relative to the mounting element or securing portion 104, as shown in FIG. 4. When inverted, for example, on a table top, the antenna deflectors 508 will reflect the radio signal upward. On the other hand, the circular antenna reflector 504 reflects the radio signal outward in a 360 degree pattern, as shown in FIG. 3. Both the antenna reflector 504 and antenna deflectors 508 can be constructed from most metallic or metallically coated materials, or any other material capable of directing radio signals. Both the antenna reflector 504 and the antenna deflector 508 can be referred to as reflector plates. Although the example elements, the antenna reflectors 504 and antenna deflectors 508 can be constructed from a single piece and together form a single reflector plate.

Although FIG. 5 illustrates the antenna reflector 504 designed as a circular ring positioned about an interior perimeter of the wireless access point, individual antenna reflectors 504 may be positioned in each antenna section 502. Likewise, the antenna deflectors 508 may be constructed such that the deflectors 508 extend in a circular manner across the base of each section 502, similar to the way the antenna reflector 504 illustrated in FIG. 5 is a continuous ring creating a backdrop for the antenna sectors 502.

Figure 6:
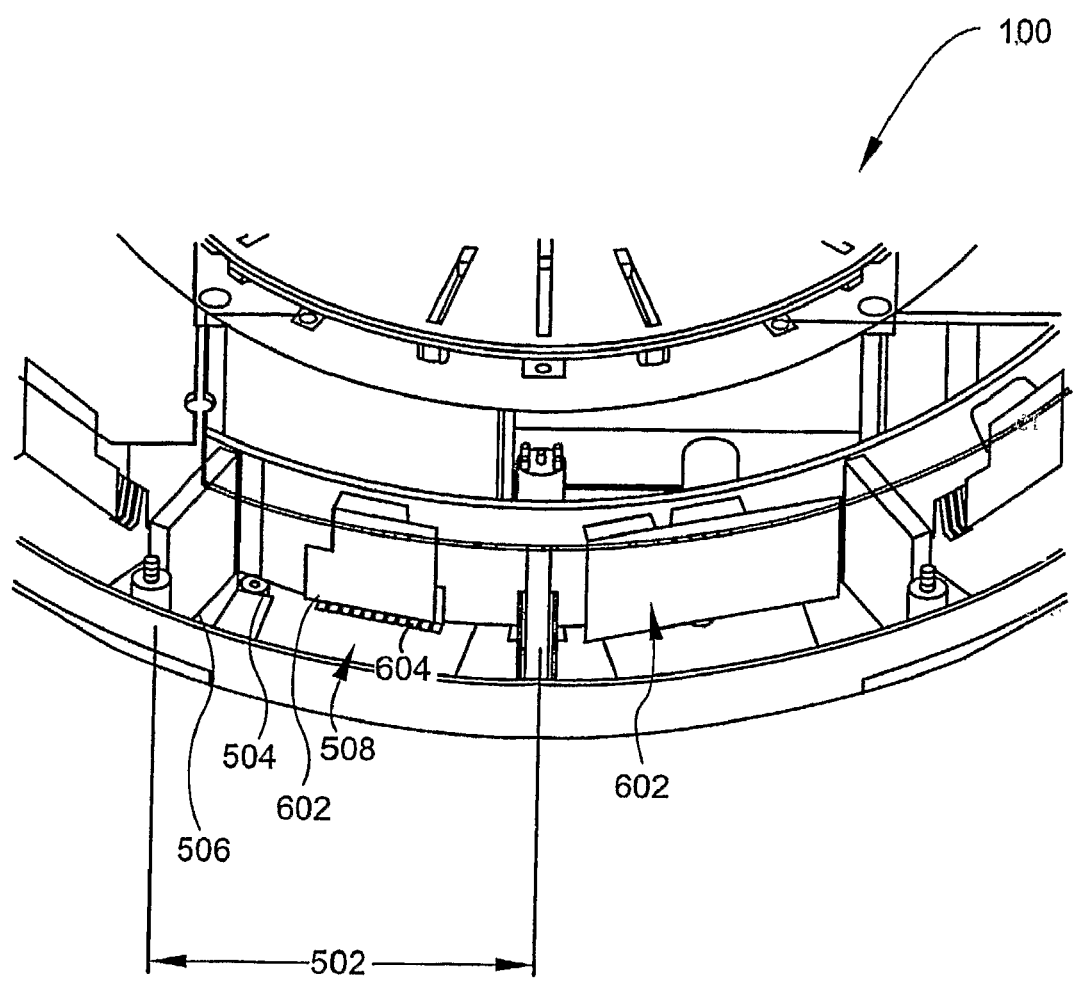
FIG. 6 is a top perspective view of the wireless access point of FIG. 5 illustrating several of the antenna sections.

FIG. 6 is a top perspective view of the wireless access point 100 of FIG. 5 further illustrating several of the antenna sections 502. As illustrated, the circular antenna reflector 504 serves both to reflect radio signals outward from the wireless access point 100 and to provide an isolation barrier between the central digital section 510 (FIG. 5) and the antenna sectors 502. As further illustrated in FIG. 6, the antennas 602 positioned within each antenna sector 502 are positioned central relative to the antenna deflectors 508, reflector 504 and absorptive isolators 504. As illustrated, the antennas 602 are connected to radio printed circuit board assemblies ("PCBA") 604.

Figure 7:
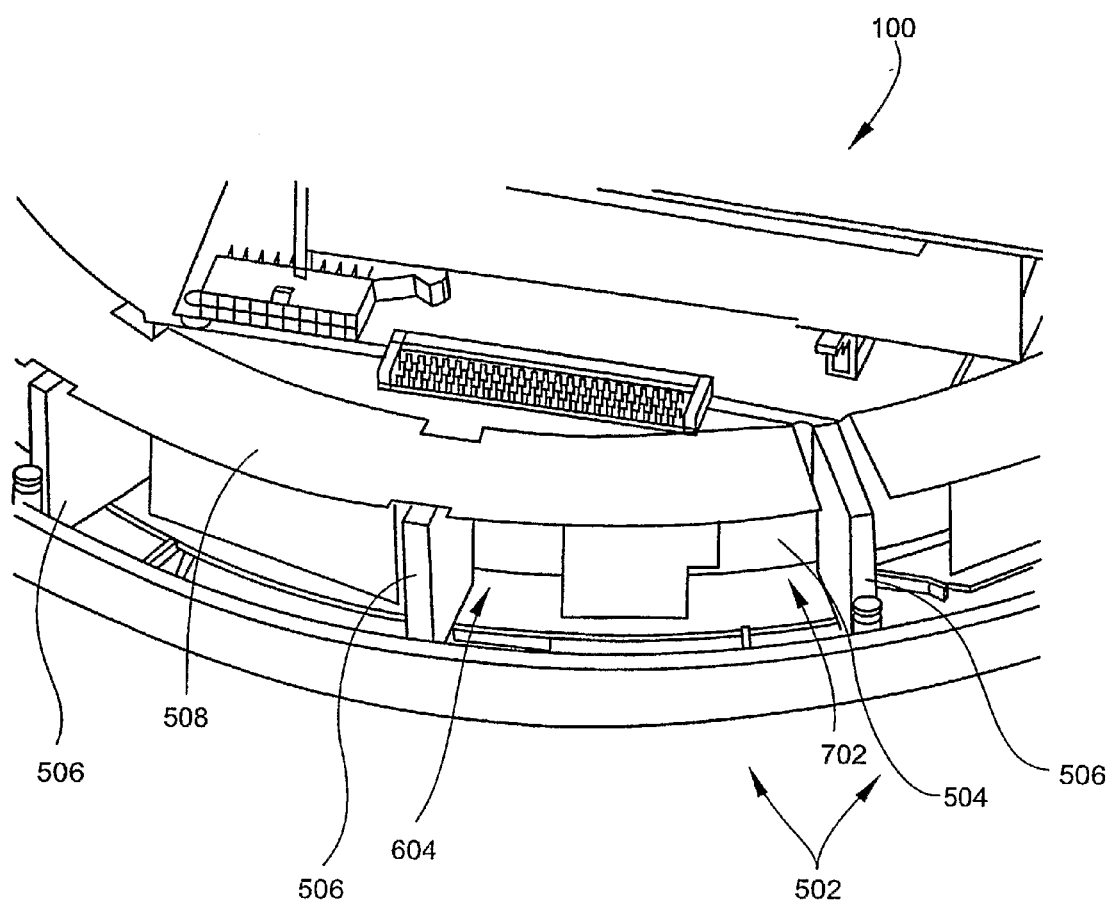
FIG. 7 is a bottom perspective view of the wireless access point of FIG. 1 illustrating several of the antenna sections as they would appear with the bottom plate removed.
Figure 8:
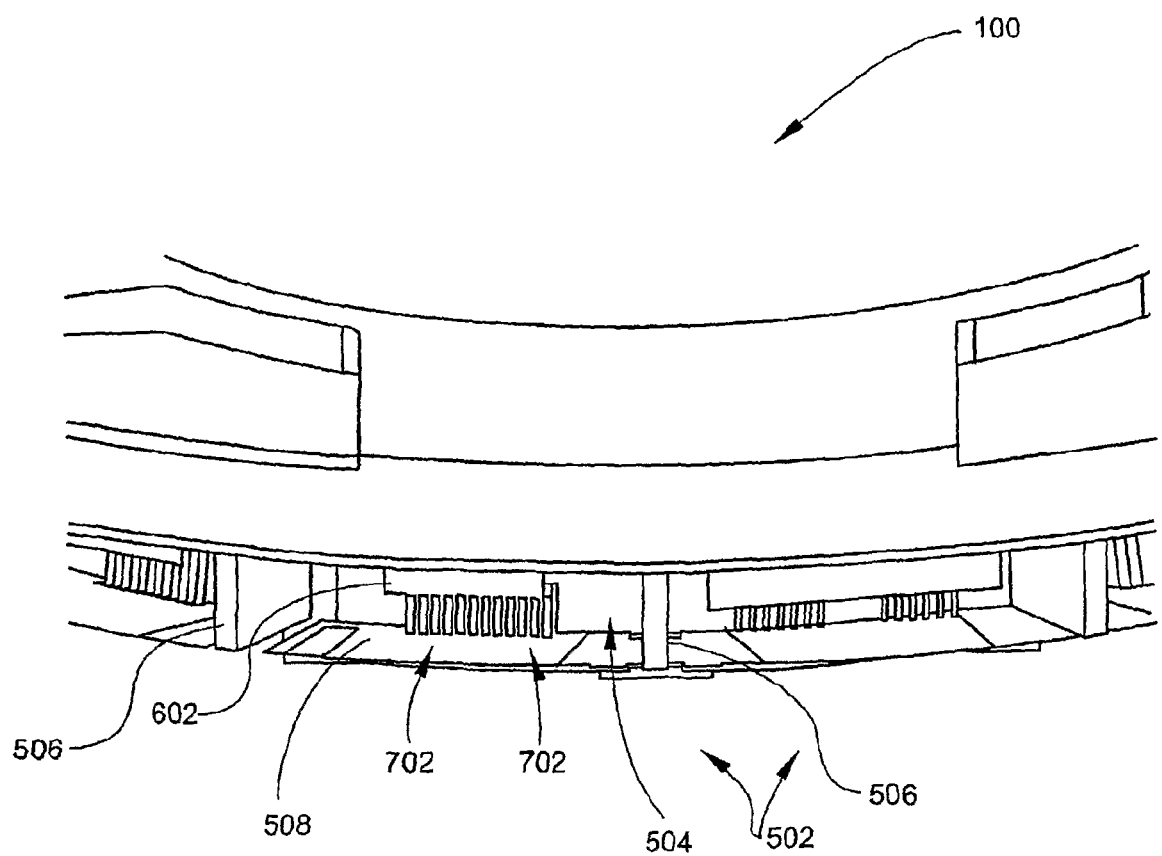
FIG. 8 is a top perspective view of the wireless access point of FIG. 7.

FIG. 7 is a bottom perspective view of the wireless access point of FIG. 1 illustrating several of the antenna sections as they would appear with the bottom plate removed. Similarly, FIG. 8 is a top perspective view of the wireless access point 100 of FIG. 7. FIGS. 7 and 8 illustrate that the antenna reflector 504 and antenna deflector 508 are grounded together 702, and that both the antenna reflector 504 and antenna deflector 508 are tied to a system ground via the circular antenna reflector 504 connection to the ground plane of the radio PCBA 604. Further, FIG. 8 shows one method, spring fingers, of connecting a metallic antenna reflector 504 to the antenna deflector 508. FIG. 8 also illustrates one implementation of the antenna deflector 508, a radio PCBA substrate with tin plated deflective patterns positioned directly below the antenna substrate. Those skilled in the art will recognize that other knows means may be utilized for connecting and grounding the structure.

Figure 9:
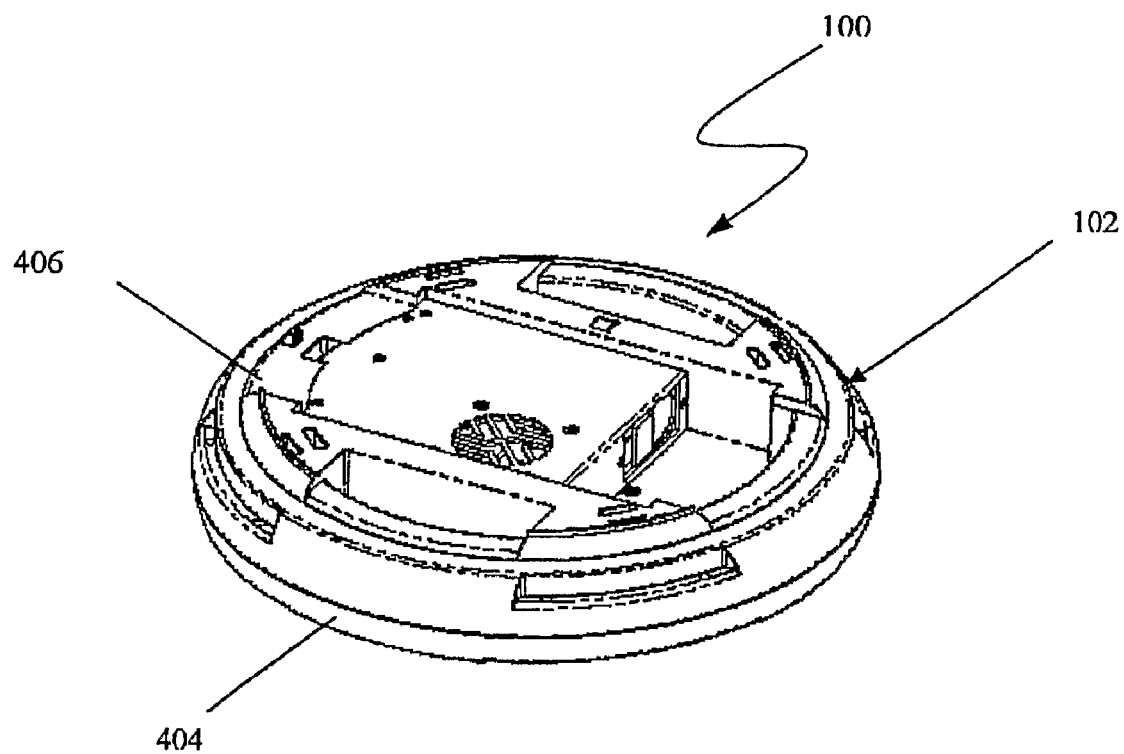
FIG. 9 is a perspective view of the bottom portion of the wireless access point of FIG. 1 with the securing portion of the wireless access point removed.

FIG. 9 is a perspective view of the array portion 102 of the wireless access point 100 of FIG. 1 with the securing portion 104 removed. As further illustrated in as a housing for the wireless access point 100. In this example, the array portion 102 is an injection molded plastic housing that can be made of one or more part. Those skilled in the art will recognize that other materials may be utilized to create the array portion 102 or housing for the wireless access point 100.

Figure 10:
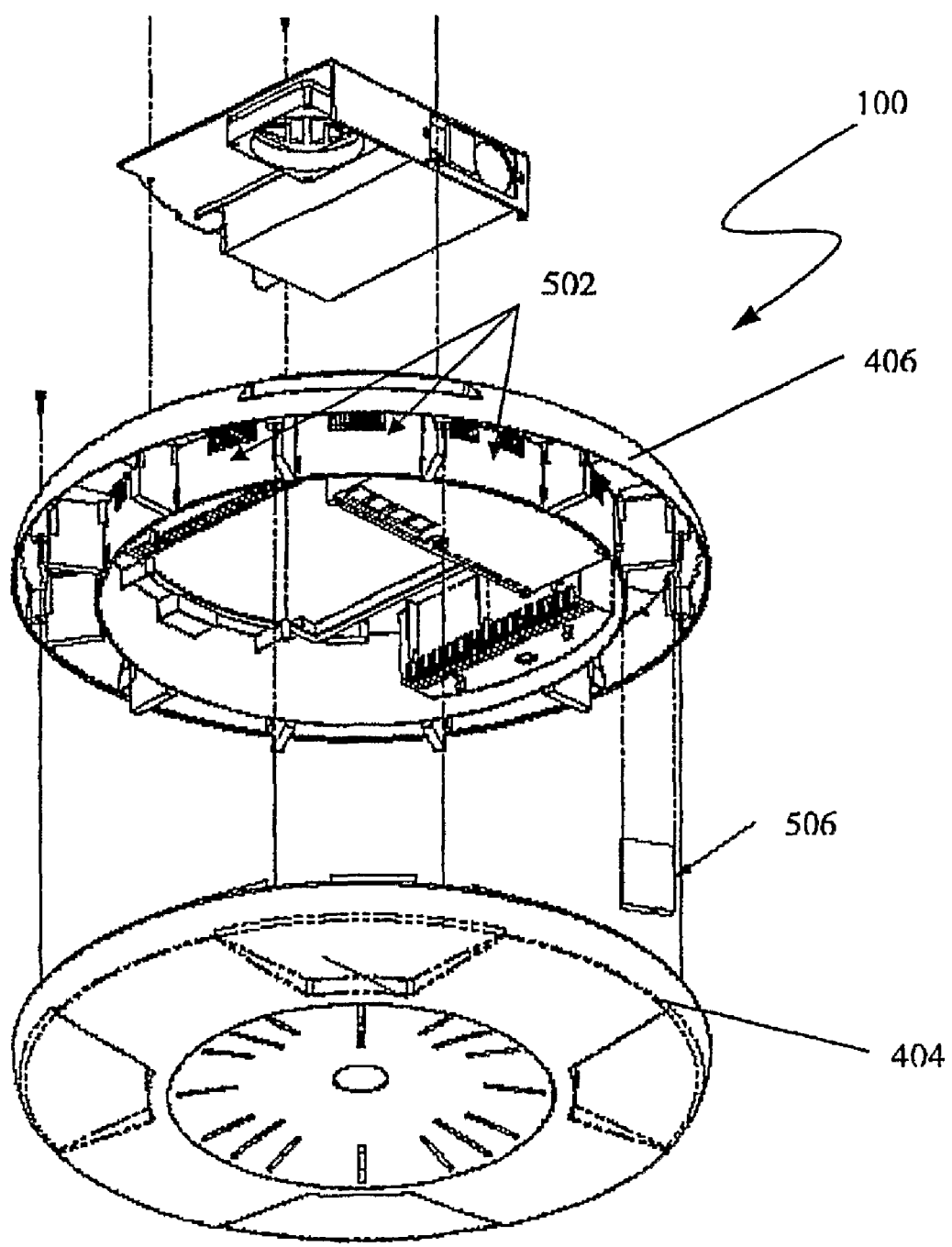
FIG. 10 is an exploded perspective top view of the wireless access point of FIG. 1.
Figure 11:
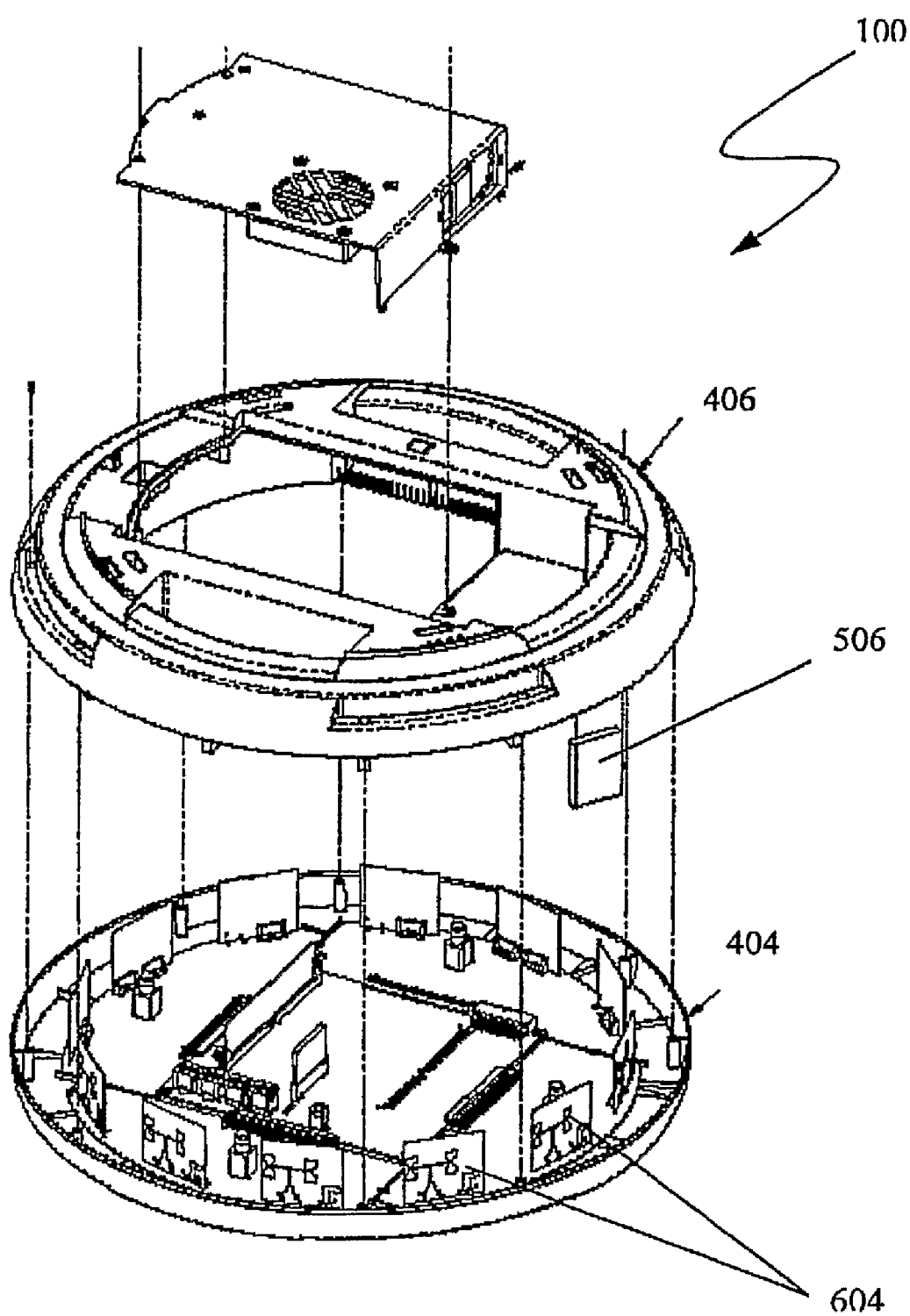
FIG. 11 is an exploded perspective bottom view of the wireless access point of FIG. 1.

FIG. 10 is an exploded perspective top view of the wireless access point 100 of FIG. 1 and FIG. 11 is an exploded perspective bottom view of the wireless access point of FIG. 1. As illustrated in FIG. 10, the wireless access point 100 may be divided into multiple antenna sectors 502 as necessary to achieve the desired coverage area. While the isolators 506 are shown positioned within the bottom cover 406 of the array portion 102 of the wireless access point 100, the isolators they may also be secured in the top cover 404 of the array portion 102. As illustrated in FIG. 11, the radio PCBA 604 may be positioned within the top cover 404 of the array portion 102. Alternatively, the radio PCBA 604 may be positioned within the bottom cover 406 of the array portion 102.

Figure 12:
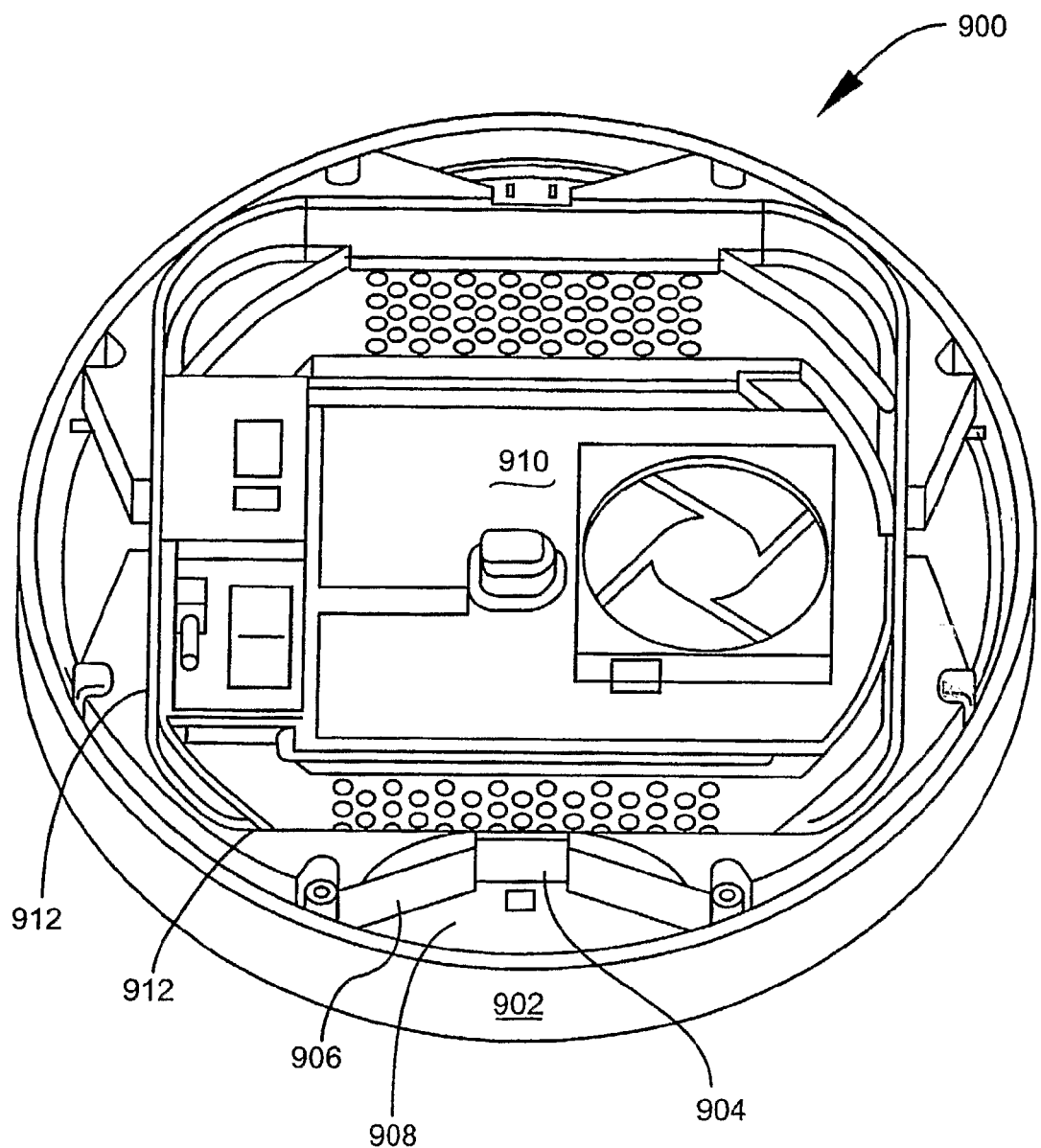
FIG. 12 is top view of another example of an implementation of the wireless access point.

FIG. 12 is top view of another example of an implementation of a wireless access point 900 having multiple antenna sectors 902. FIG. 12 illustrates and an alternative construction of the antenna reflector 904, antenna deflector 908, isolating elements 906 and grounding elements 912. The EMI suppression required in the central digital sector 910, the antenna reflector 904, antenna deflector 908, and system ground connections 912 between these elements may be designed from a single contiguous metallic surface, as illustrated or from separate elements. In the example illustrated in FIG. 12, the digital sector 910, antenna reflector 904, and antenna deflector 908 are contracted from a single thermoformed plastic liner that has been electroplated with a metallic substrate and are hence inherently grounded to each other. Alternatively, these elements may be constructed from different substrates.

Figure 13:
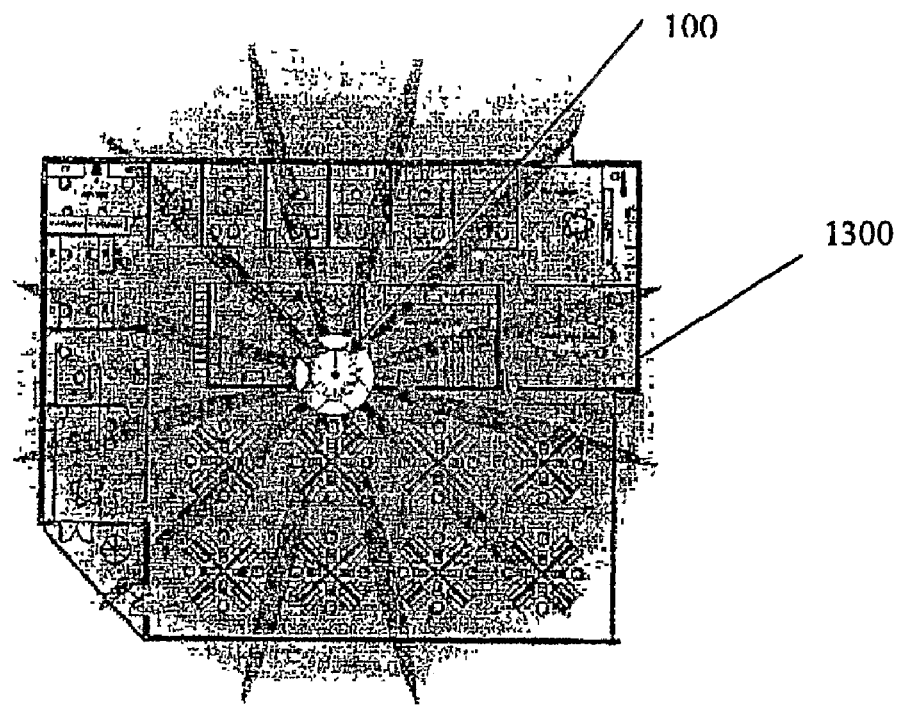
FIG. 13 illustrates a plan view of the 802.11a coverage area that may be achieved by the wireless access point of FIG. 1.
Figure 14:
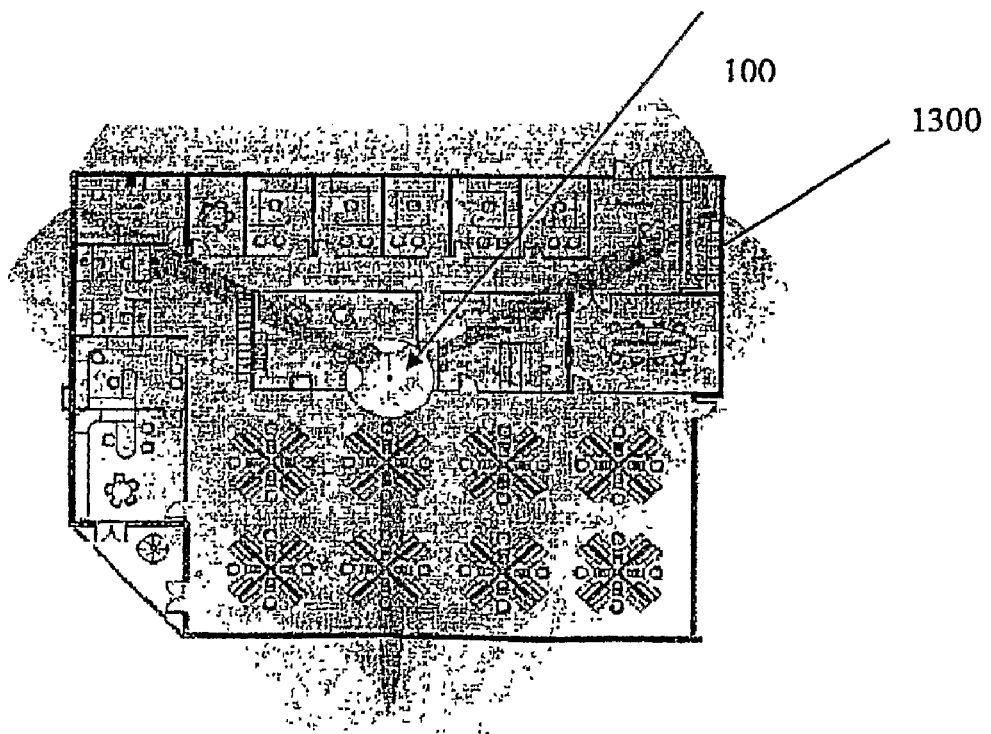
FIG. 14 illustrates a plan view of the 802.11b/g coverage area that may be achieved by the wireless access point of FIG. 1.
Figure 15:
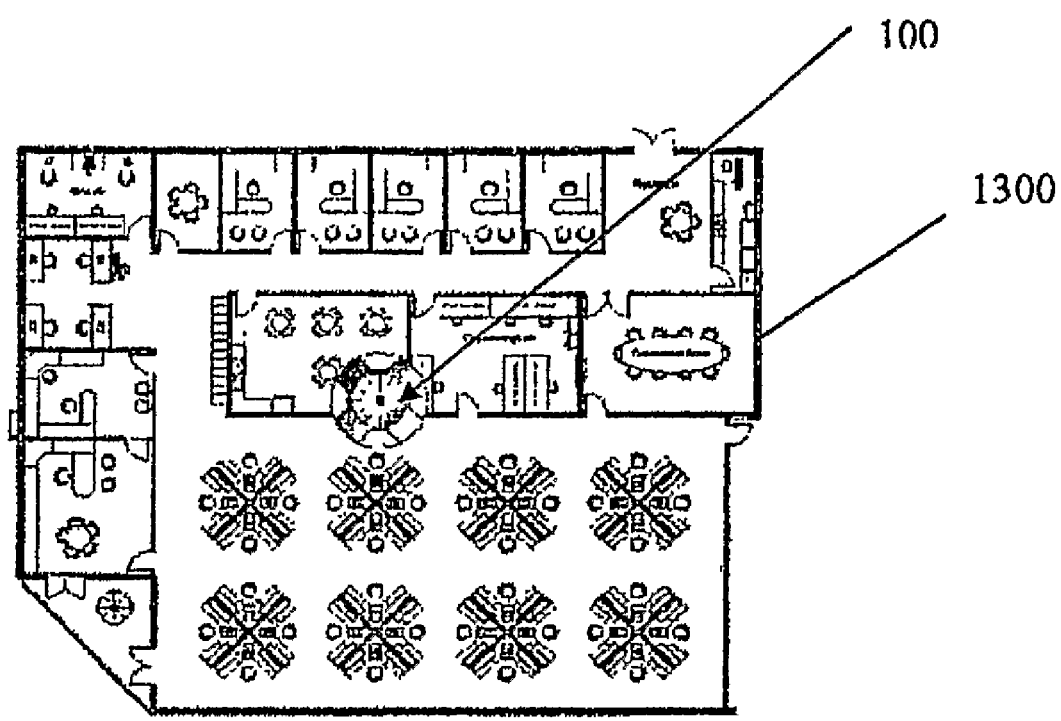
FIG. 15 illustrates a plan view of the area of listening coverage that may be

FIG. 13 illustrates a plan view of the 802.11a coverage area that may be achieved by the wireless access point 100 of FIG. 1 over a given area 1300. FIG. 14 illustrates a plan view of the 802.11b/g coverage area that may be achieved by the wireless access point 100 of FIG. 1 over a given area 1300. FIG. 15 illustrates a plan view of the area of listening coverage that may be achieved by the wireless access point 100 of FIG. 1 over a given area 1300.

While various embodiments of the invention have been described, it will be apparent to those of ordinary skill in the art that many more embodiments and implementations are possible that are within the scope of this invention.

What is claimed is:

1. A wireless access point for transmitting radio signals, the wireless access point comprising:
    an array portion configured to fasten to a securing portion to define an array portion side and a securing portion side of the wireless access point, the securing portion configured to attach to a mounting element for operation of the wireless access point, the array portion and securing portion positioned in substantially parallel planes and having a shape defining a perimeter of the wireless access point when fastened;
    absorptive isolators positioned about the perimeter of the wireless access point dividing the perimeter of the wireless access point into sectors in a circular pattern around a center of the perimeter of the wireless access point, where the absorptive isolators are of a material that absorbs electromagnetic energy;
    antennas positioned within each sector, the antennas oriented to transmit and receive signals radially from the sector corresponding to each antenna;
    at least one reflector plate positioned in the sectors between the antennas and the wireless access point center and oriented substantially perpendicular to the array portion to direct the radio signals within each sector so that the radio signals radiate from the wireless access point radially in a 360 degree pattern; and
    at least one deflector plate positioned in the sectors in a plane substantially parallel with the array portion and oriented relative to the antennas so as to direct the radio signals within each sector outwardly from the array portion side of the wireless access point in a 180 degree pattern relative to a line in the plane of the array portion that crosses the center of the circular pattern of the sectors where the at least one deflector late is of a material that reflects electromagnetic energy.

2. The wireless access point of claim 1 where the isolators are foam.

3. A wireless access point for transmitting radio signals, the wireless access point comprising:
    an array portion configured to fasten to a securing portion to define an array portion side and a securing portion side of the wireless access point, the securing portion configured to attach to a mounting element for operation of the wireless access point, the array portion and securing portion positioned in substantially parallel planes and having a shape defining a perimeter of the wireless access point when fastened;
    a plurality of antenna sectors arranged in a generally circular pattern and capable of transmitting signals outwardly 360 degrees from the center of the wireless access point;
    absorptive isolators made of an absorptive material that absorbs electromagnetic energy located between each antenna sector;
    a reflective surface within each antenna sector, the reflective surface positioned on an interior perimeter of the wireless access point and oriented substantially perpendicular to the array portion to direct the transmission of radio signals radially in a 360 degree pattern surrounding the wireless access point; and
    a deflective surface positioned within each antenna sector in a plane substantially parallel with the array portion and oriented to direct the radio signals within each sector outwardly from the array portion side of the wireless access point in a 180 degree pattern relative to any line in the plane of the array portion that crosses the center of the circular pattern of the sectors, where the at least one deflector plate is of a material that reflects electromagnetic energy.

4. The wireless access point of claim 3 where the wireless access point further includes a digital section and the deflective surface acts as an isolation barrier between the central digital section and the antenna sectors.

5. The wireless access point of claim 3 where the absorptive isolators are foam.

6. The wireless access point of claim 3 where the reflector surface includes a ground plate.

7. The wireless access point of claim 3 where the deflector surface includes a ground plate.

8. The wireless access point of claim 3 where the reflector surface includes a reflective ring.

9. The wireless access point of claim 3 where the reflector surface includes a both a reflective ring and a ground plate.

10. The wireless access point of claim 3 where the wireless LAN array is generally round in shape.

11. The wireless access point of claim 3 where the wireless LAN array is generally elliptical in shape.

12. The wireless access point of claim 3 where wireless access point further includes a digital suppression element and where the digital suppression element, antenna reflective surface and antenna deflector surface are made from one contiguous piece of conductive and reflective material and are inherently grounded together.

* * * * *